Figure 1:
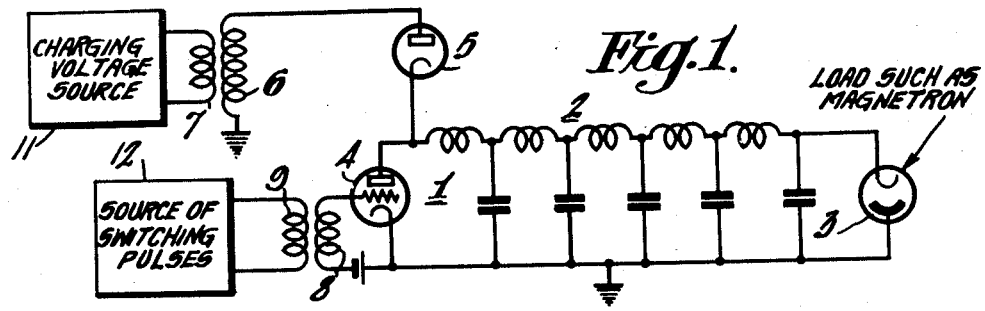

Feb. 7, 1950  A. D. BLUMLEIN  2,496,979

APPARATUS FOR GENERATING ELECTRICAL IMPULSES

Filed Sept. 24, 1945

INVENTOR
ALAN DOWER BLUMLEIN,
DECEASED, DOREEN BLUMLEIN,
EXECUTRIX
BY H. G. Grover
ATTORNEY Patented Feb. 7, 1950

2,496,979

UNITED STATES PATENT OFFICE 2,496,979

APPARATUS FOR GENERATING ELECTRICAL IMPULSES

Alan Dower Blumlein, deceased, late of Ealing, London, England, by Doreen Blumlein, executrix, Lanherne, Lescudjack, Penzance, Cornwall, England, assignor to Electric & Musical Industries Limited, Hayes, England, a company of Great Britain Application September 24, 1945, Serial No. 618,338
In Great Britain October 10, 1941

Section 1, Public Law 690, August 8, 1946
Patent expires October 10, 1961

9 Claims. (Cl. 171—97)

The present invention relates to apparatus for generating electrical impulses.

It is frequently necessary to apply electrical impulses of high voltage and short duration to apparatus such as, for example, radio transmitters used for transmitting short pulses of radio frequency oscillations in the detection of reflecting objects such as aircraft.

It is the object of the present invention to provide an improved apparatus for generating electrical impulses of high voltage and short duration.

According to one feature of the present invention there is provided apparatus for generating electrical impulses comprising a storage device including capacity and inductance, charging means for charging the capacity of said storage device, a switch connected to said device and adapted to provide a path of low resistance and a uni-laterally conducting load associated with said storage device in such a manner that if said charging means is caused to charge said device, the polarity of the voltage across said capacity is such as to render said load non-conducting, the arrangement being such that if after said device has been charged said switch is caused to provide a path of low resistance, the charge in said device is re-distributed so that the polarity of the voltage across said capacity is reversed whereupon said load becomes conducting and dissipates the energy stored in said device.

A further object of the present invention is to provide improved apparatus for generating electrical impulses of high voltage and short duration in which higher voltages may be applied to the load.

According to another feature of the present invention therefore there is provided apparatus for generating electrical impulses comprising a first storage device including capacity and inductance, a second storage device including capacity, a load connected between said storage devices, charging means for charging said storage devices in the same sense, and a switch adapted to provide a path of low resistance associated with said first storage device, the arrangement being such that if said storage devices are charged by said charging means and said switch is then caused to provide a path of low resistance, the energy in said first storage device is redistributed so that the polarity of the voltage across the capacity thereof is reversed and is applied in series with the voltage across the capacity of said second storage device across said load, whereby the voltage across said load is increased.

According to a further feature of the invention there is provided apparatus for generating electrical impulses comprising a plurality of time delay networks, charging means for charging the capacity of said networks in the same sense, a switch adapted to provide a path of low resistance across one of said networks and a load so connected between said networks that if said networks are charged by said charging means and said switch is then caused to provide a path of low resistance, voltage waves propagate along said networks and a pulse of high voltage is developed across said load due to the superposition of voltage waves reversed in sense by reflection upon voltage waves of the same polarity as that to which said networks were charged.

Figure 2:
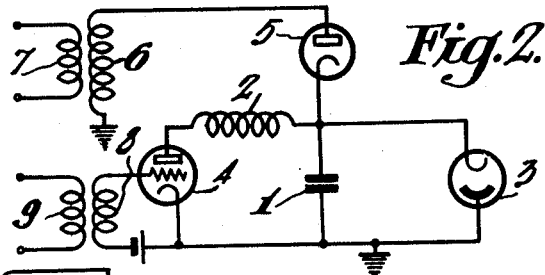
Figure 3:
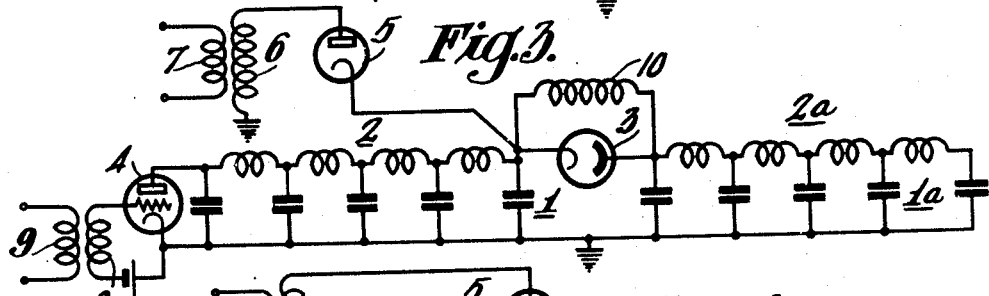
Figure 4:
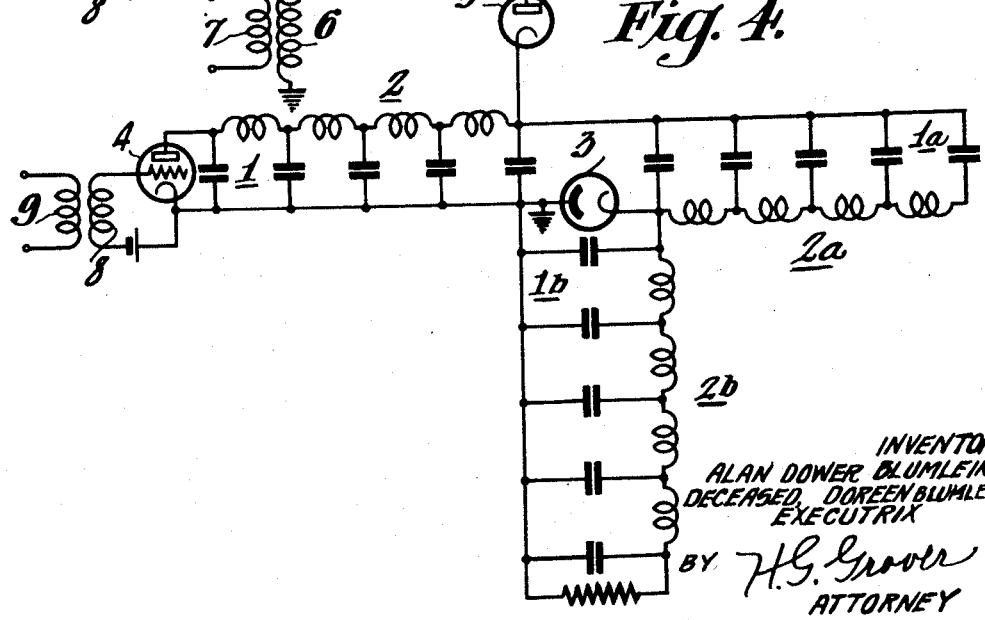

In order that the invention may be clearly understood and readily carried into effect, the same will now be described more fully with reference to the accompanying drawings in which:

Figure 1 shows a schematic circuit diagram of one form of the invention utilising a time delay network for reversing the polarity of the voltage of the impulses, and Figure 2 shows the schematic circuit diagram of an alternative arrangement for reversing the polarity of the voltage of the impulses, and Figures 3 and 4 show the schematic circuit diagrams of arrangements utilising two time delay networks for generating voltage impulses of greater amplitude.

Referring now to Figure 1 of the drawings it will be seen that the arrangement shown comprises a time delay network having shunt capacity elements 1 and series inductance elements 2, a load 3 connected to one end of said network, said load 3 being shown diagrammatically as a magnetron short wave oscillator, and a switch 4 adapted to provide a path of low resistance consisting of a low impedance gas discharge tube such as that known under the registered trademark "Thyratron" connected across the other end of said network. Also connected to the same end of said network as said switch is a unilaterally conducting device 5 in series with the winding 6 of a transformer to which is coupled a further winding 7 connected to a source of alternating voltage (not shown). The grid circuit of the device 4 includes transformer secondary 8 coupled to a further transformer primary 9 which is connected to a source of switching pulses (not shown). The cathode of the device 4 and the anode of the device 3 are earthed and one plate of each of the shunt condensers 1 of the network is also earthed.

The arrangement operates as follows. When the voltage developed across the inductance 6 is positive, current flows through the device 5 and charges the capacities 1 of the time delay network, the polarity of the voltage developed across said capacities being such that the device 3 remains non-conducting. After said capacities have been charged and the voltage across the inductance 6 has become negative to render the device 5 non-conducting, a switching pulse is applied to the grid of the device 4 and causes the anode impedance of said device to fall to a very low value. The voltage across the left-hand end of said time delay network thus falls rapidly to zero and this falling voltage propagates as a wave along the said network from left to right. On reaching the right-hand end of said network, said voltage wave would in the absence of said load 3 be reflected as a negative voltage wave of equal amplitude so that the voltage across the right-hand end of said network would fall from V to —V, V being the voltage to which the capacity 1 of said network was originally charged. The device 3, however, becomes conducting when the voltage across the right-hand end of said network becomes negative and the energy of the negative voltage impulse developed as a result of the redistribution of the charge due to the reflection of the wave is therefore dissipated in said device 3 and causes said device to generate a short pulse of radio frequency oscillations.

It will be appreciated that this arrangement has the advantage that the cathode of the device 4 and the anode of the device 3 can be earthed directly, thus avoiding undesirable effects due to stray capacities between these electrodes and earth and also avoiding the necessity for special insulation of the cathode heating current supply to the device 4.

Referring now to Figure 2 of the drawings, it will be seen that the time delay network comprising elements 1 and 2 of Figure 1 has been replaced by a single capacity 1 and a single inductance 2, the remaining elements of the circuit being numbered to correspond with similar elements in Figure 1. In the arrangement shown in Figure 2, the reversal of the voltage across the condenser 1 is obtained by causing a half cycle of self-oscillation between the capacity 1 and the inductance 2. Thus, the condenser 1 is charged as before through the unilaterally conducting device 5 and subsequently the device 4 is rendered conducting and the inductance 2 is thereby connected in shunt with the capacity 1 so forming an oscillatory circuit in which an oscillatory current flows as the charge in the capacity 1 discharges through inductance 2. It will be seen that after said oscillatory circuit has performed a quarter oscillation the voltage across the condenser 1 reverses and is then of suitable polarity to excite the magnetron 3 so that as a result of the redistribution of the charge the energy in the system can then be dissipated in said magnetron 3 and cause said magnetron to generate a short pulse of radio frequency oscillations.

The apparatus described above which provides means for reversing the polarity of the voltage across the capacity before the energy is dissipated in the load may be combined with further apparatus operating without reversal of polarity so as to apply to a load a voltage substantially equal to twice the voltage which each apparatus is separately capable of applying to said load. Two examples of apparatus of this kind will now be described with reference to Figures 3 and 4 in which elements corresponding to elements in Figures 1 and 2 have been given similar reference numerals. Referring to Figure 3, it will be seen that this arrangement differs from that of Figure 1 in that a second time delay network having shunt capacities 1a and series inductance 2a has been introduced. The magnetron 3 has its cathode connected to the right-hand end of the network comprising elements 1 and 2 as before and has its anode connected to the left-hand end of the second delay network comprising capacity elements 1a and the inductance elements 2a. The choke 10 is connected in shunt with the magnetron and is of such a value that it presents an impedance large compared with the resistance of the magnetron 3 when conducting at the component frequencies of the pulse waveform which is in operation applied to the magnetron while at the same time presenting a relatively low impedance to currents having a frequency of the same order as that of the charging current for the charging capacity elements 1, 1a.

This arrangement operates as follows. During the charging cycle, current flows through the unilaterally conducting device 5 and charges the capacities 1 and 1a of the two time delay networks. When the device 4 is rendered conducting, the voltage drop which arises at the left-hand end of the network connected thereto propagates along said network towards the right. When it reaches the magnetron 3, it is reflected in reversed sense and causes the magnetron to become conducting, with the result that the original voltage drop is in part transmitted through the magnetron into the network 2a and in part reflected in reversed sense back into the network 2. The cathode of the magnetron is thus held at a negative voltage while its anode remains positive due to the voltage on the network 2a, and this state of affairs persists until the transmitted and reflected waves are reflected at the right-hand end of network 2a and the left-hand of network 2 respectively and return to the magnetron 3 whereupon the voltage across the magnetron collapses. It will thus be seen that due to the superimposition of voltage waves reversed in sense by reflection upon voltage waves of the same polarity as that to which the networks 2, 2a were charged, a pulse of high voltage is developed across the magnetron 3. The time delays of each of the networks are preferably equal and their characteristic impedances are preferably arranged to be equal to half the operating impedance of the magnetron 3 so that as said magnetron 3 draws current, its impedance matches that of the two networks in series and one half of the open circuit voltage which would in the absence of said magnetron 3 be developed is set up across said magnetron 3. Thus, with this arrangement the voltage developed across the magnetron is doubled and becomes substantially equal to that to which each of the networks was charged.

In one case in which it was desired to apply impulses of 20 kilovolts to a load having a resistance of 800 ohms when conducting, each impulse having a duration of 2 microseconds, each of the time delay networks 2, 2a was designed to have a delay time of 1 microsecond and consisted of 25 shunt capacity elements having a capacity of 100 micro-microfarads and 24 series inductance units, each having a self-inductance of 13.5 microhenries, together with two half sections having a self-inductance of 8 microhenries. Adjacent inductance elements were coupled together in known manner so as to give the networks a more uniform delay frequency characteristic, and, when coupled together, each pair of inductance elements had a combined inductance of 32 microhenries. The inductance 10 had a value of 40 millihenries and was subdivided into six units in order to reduce shunt capacity and also to distribute the voltage stress across the inductance.

Turning now to Figure 4, it will be seen that the circuit shown differs from that of Figure 3 in two respects. First, the magnetron 3 and the series elements 2a have been transferred from the high voltage line to the earthed line of the right-hand network, so that the common earthed conductor to which the shunt elements 1 are connected is connected through the magnetron 3 to the series elements 2a and the common conductor to which the shunt elements 1a are connected is connected to the series elements 2. This arrangement has the advantages that the anode of the magnetron 3 is earthed and the earth capacity of the right-hand network and also the earth capacity of the heater transformer winding for the device 5, if such is provided, may constitute part or the whole of the right-hand shunt element 1 of the left-hand network. Further, if the heater of the cathode of the magnetron 3 is fed from a winding coupled to that feeding the heater of the device 5, the capacity between said windings can form the whole or a part of the left-hand shunt element 1a of the right-hand network.

Secondly, it will be seen that a further terminated time delay network comprising the shunt capacities 1b and series inductances 2b replaces the inductance 10 included in the circuit of Figure 3. This arrangement offers the advantage that the further time delay network can be arranged to provide a positive voltage pulse across the magnetron 3 a short time after said magnetron 3 has been excited and will therefore prevent re-excitation of said magnetron 3 by any subsidiary negative pulses which may be developed due to reflections in the time delay networks comprising elements 1, 2 and 1a, 2a. For this purpose, the further time delay network is preferably terminated by resistive termination of low or even zero value and when so terminated has a further advantage of providing in shunt with the magnetron 3 a constant resistive impedance at the component frequencies of the pulses, thus avoiding distortion of the pulse waveform which may arise in the arrangement of Figure 3 due to the change of impedance of the inductance 10 with frequency.

It will be understood that since the time delay networks above referred to will inevitably have some losses, the voltages obtained will not be quite equal to the charging voltage. Further, as it is desirable to leave a slight negative voltage on the device 4 in order to ensure extinction, the characteristic impedance of the time delay network comprising elements 1 and 2 is preferably made slightly higher than that of the time delay network comprising elements 1a, 2a, so as to cause a suitable extinction voltage to be reflected back to said device 4. Further, the operation of the system may in some cases be improved by making the time delay and charactertistic impedances of these two networks slightly dissimilar. For example, the time delay network comprising elements 1 and 2 may be given a 10% longer time delay and a 10% lower characteristic impedance compared with the time delay network comprising elements 1a and 2a.

It will be appreciated that, although in the examples of the invention above referred to a low impedance gas discharge tube has been shown as the switch adapted to provide a path of low resistance, other devices may be used for this purpose. For example, a spark gap may be used, and the gap may either be of the self-sparking rotary kind in which two electrodes are caused to approach closely to each other so as to cause a spark to pass between them, or, alternatively, the spark gap may be of the stationary kind and may be provided with a trigger electrode which causes the path between the main electrodes to break down to a low resistance when a suitable voltage is applied to the trigger electrode.

If desired, the capacity of the time delay network or other storage device may be charged through an inductance forming therewith a series circuit resonant at the frequency of the source of alternating voltage so that the capacity is charged to twice the peak voltage of said source. In this case, the unilaterally conducting device 5 may be omitted due to the presence of the inductances between the storage device and the source of alternating voltage.

Although the invention has been described with reference to the excitation of a unilaterally conducting load such as a magnetron, it will be appreciated that, if a form of the invention, such as that described with reference to Figure 3 or 4 in which substantially no voltage is developed across the load during charging, is used, any form of load suitable for dissipating the stored energy in a relatively short time may be employed.

What is claimed is:

1. Apparatus for generating electrical impulses comprising a storage device including shunt capacity and series inductance, charging means for charging the capacity of said storage device, the shunt capacity terminal adjacent to the series inductance being the high potential terminal, a switch connected to said device between one end of the series inductance and the low potential side of the shunt capacity for providing a path of low resistance and a unilaterally conducting load connected between the other end of the series inductance and the low capacity side of the shunt capacity and connected in such direction that if said charging means are caused to charge said device the polarity of the voltage across said capacity is such as to render said load non-conducting, the values of said shunt capacity and said series inductance being such that if after said device has been charged said switch is closed to provide a path of low resistance, the charge in said device is re-distributed so that the polarity of the voltage across said capacity is reversed whereupon said load becomes conducting and dissipates the energy stored in said device.

2. Apparatus according to claim 1 in which said storage device is a time delay network and said switch and said load are respectively connected across opposite ends of said network, the re-distribution of said energy taking place by propagation of waves along said network.

3. Apparatus according to claim 1 in which the inductance and capacity of said storage device are connected in series with said switch and said load is connected in shunt with said capacity, the re-distribution of said energy taking place by self-oscillation of said inductance with said capacity.

4. Apparatus for generating electrical impulses comprising a plurality of time delay networks, charging means for charging the capacity of said networks in the same sense, a switch connected across one end of one of said networks to provide a path of low resistance across said one network when the switch is closed, the other of said networks being open at one end, and a load so connected between the other ends of said networks that if said networks are charged by said charging means and said switch is then caused to provide a path of low resistance, voltage waves propagate along said networks and a pulse of high voltage is developed across said load due to the superposition of voltage waves reversed in sense by reflection upon voltage waves of the same polarity as that to which said networks were charged.

5. Apparatus according to claim 4 comprising two time delay networks having substantially the same time delay and characteristic impedance, and in which the resistance of said load when dissipating energy is equal to twice said characteristic impedance.

6. Apparatus according to claim 5 in which the shunt elements of each of said networks are connected to common conductors, the common conductor of the network across one end of which said switch is connected being earthed and connected via said load to the series elements of the other of said network and the common conductor of the other of said networks being connected to the series elements of said first-mentioned network.

7. Apparatus according to claim 6 in which said load is unilaterally conducting and is connected so as to be substantially non-conducting during the charging of said networks and in which an impedance high compared with the resistance of said load when dissipating energy is connected in parallel with said load so that in operation said charging means charges the capacity of one of said networks directly and charges the capacity of the other of said networks via said impedance.

8. Apparatus according to claim 7 in which said impedance is a terminated time delay network.

9. Apparatus for generating electrical impulses comprising a time delay network including shunt capacity and series inductance, charging means for charging the capacity of said time delay network, a switch connected across one end of said network for providing a path of low resistance when the switch is closed, a unilaterally conducting load connected across the other end of said network and connected in such direction that if said charging means are caused to charge said network the polarity of the voltage across said capacity is such as to render such load non-conducting, whereby if said switch is closed to provide a path of low resistance after said network has been charged the charge in said network is redistributed so that the polarity of the voltage across said capacity is reversed whereupon said load becomes conducting and dissipates the energy stored in said network.

DOREEN BLUMLEIN.
*Executrix of the Estate of Alan Dower Blumlein, Deceased.*

REFERENCES CITED

The following references are of record in the file of this patent:

UNITED STATES PATENTS

| Number | Name | Date |
|---|---|---|
| 2,405,069 | Tonks | July 30, 1946 |
| 2,408,824 | Varela | Oct. 8, 1946 |